(12) United States Patent
Osada

(10) Patent No.: US 9,274,775 B2
(45) Date of Patent: Mar. 1, 2016

(54) APPARATUS, CONTROL METHOD, AND STORAGE MEDIUM TO INSTRUCT A FRAMEWORK TO STOP A TARGET APPLICATION BASED ON A USAGE AMOUNT OF A RESOURCE AND A TYPE OF THE TARGET APPLICATION

(71) Applicant: CANON KABUSHIKI KAISHA, Tokyo (JP)

(72) Inventor: Mamoru Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/738,190

(22) Filed: Jan. 10, 2013

(65) Prior Publication Data

US 2013/0185712 A1 Jul. 18, 2013

(30) Foreign Application Priority Data

Jan. 16, 2012 (JP) ................................. 2012-006202

(51) Int. Cl.
 G06F 9/445 (2006.01)
 G06F 9/44 (2006.01)
(52) U.S. Cl.
 CPC . *G06F 8/61* (2013.01); *G06F 9/445* (2013.01)
(58) Field of Classification Search
 None
 See application file for complete search history.

(56) References Cited

U.S. PATENT DOCUMENTS

| 6,651,186 | B1* | 11/2003 | Schwabe | G06F 9/44589 714/38.14 |
| 7,624,394 | B1* | 11/2009 | Christopher, Jr. | G06F 8/61 717/174 |
| 7,636,172 | B2* | 12/2009 | Akiyoshi et al. | 358/1.13 |
| 8,312,419 | B2* | 11/2012 | Wilcock | G06F 8/10 717/104 |
| 8,527,950 | B2* | 9/2013 | Berry | G06F 9/4448 717/124 |
| 2003/0110252 | A1* | 6/2003 | Yang-Huffman | 709/224 |
| 2004/0210895 | A1* | 10/2004 | Esfahany | G06F 11/1482 717/174 |
| 2005/0268104 | A1* | 12/2005 | Sugishita et al. | 713/176 |
| 2008/0141240 | A1* | 6/2008 | Uthe | 717/174 |
| 2009/0293051 | A1* | 11/2009 | Krywaniuk | 717/173 |
| 2010/0050172 | A1* | 2/2010 | Ferris | 718/1 |
| 2010/0146345 | A1* | 6/2010 | Matsuda | 714/48 |

FOREIGN PATENT DOCUMENTS

| JP | 2003-256225 A | 9/2003 |
| JP | 2004-127253 A | 4/2004 |
| JP | 2006-338268 A | 12/2006 |
| JP | 2007-199811 A | 8/2007 |
| JP | 2010-134871 A | 6/2010 |
| JP | 2011-070394 A | 4/2011 |
| JP | 2011-118843 A | 6/2011 |

* cited by examiner

*Primary Examiner* — Insun Kang
*Assistant Examiner* — Devayani R Talukdar
(74) *Attorney, Agent, or Firm* — Canon USA, Inc., IP Division

(57) ABSTRACT

At a timing after a target application is installed, in a case where a usage amount of a resource used at a predetermined timing by the target application exceeds a declaration of a maximum value of the usage amount of the resource described in an application file corresponding to the target application, a framework is instructed to stop the target application.

7 Claims, 18 Drawing Sheets

FIG.7

700 — APPLICATION MANAGEMENT

APPLICATION LIST
INSTALL
SETTINGS

APPLICATION LIST

| NAME | VERSION | STATE | DISK USAGE AMOUNT | MAXIMUM DISK USAGE |
|---|---|---|---|---|
| APPLICATION A | 1.0.2 | START | 12MB | 20MB |
| APPLICATION B | 2.1.1 | START | 15MB | 16MB |

701 — STATE
702 — DISK USAGE AMOUNT
703 — MAXIMUM DISK USAGE

704 — APPLICATION MANAGEMENT

APPLICATION LIST
INSTALL
SETTINGS

APPLICATION LIST

| NAME | VERSION | STATE | DISK USAGE AMOUNT | MAXIMUM DISK USAGE |
|---|---|---|---|---|
| APPLICATION A | 1.0.2 | STOP (RESOURCE OVER) | 20MB | 20MB |
| APPLICATION B | 2.1.1 | START | 15MB | 16MB |

705 — STATE
706 — DISK USAGE AMOUNT

FIG.9

| APPLICATION MANAGEMENT ~900 | | | |
|---|---|---|---|
| APPLICATION LIST | SETTINGS | | |
| INSTALL | RESOURCE MONITORING CONDITION ~901 | | |
| SETTINGS | APPLICATION | PROCESSING | |
| | APPLICATION A | ◉ WHEN RESOURCE OVER IS DETECTED, STOP IMMEDIATELY | ◉ PERMITTED UP TO OVER 2% ~902 |
| | APPLICATION B | ◉ WHEN RESOURCE OVER IS DETECTED, STOP IMMEDIATELY | ◉ PERMITTED UP TO OVER 2% ~903 |
| | MONITORING PERIOD ~904 ◉ ONCE/DAY  ◉ ONCE/HOUR | | |

FIG.10

| APPLICATION MANAGEMENT | | | |
|---|---|---|---|
| APPLICATION LIST | SETTINGS | | |
| INSTALL | PROCESSING WHEN APPLICATION IS STOPPED DUE TO RESOURCE OVER ~1001 | | |
| SETTINGS | JOB TYPE | PROCESSING | |
| | COPY | ⊙ CANCEL | ⊙ CONTINUE ~1002 |
| | PRINTING | ⊙ CANCEL | ⊙ CONTINUE ~1003 |
| | SCAN | ⊙ CANCEL | ~1004 |

1000

1400

AN ERROR HAS OCCURRED.
CALL A SERVICEMAN. ~1401
ERROR CODE: Ennn-mmmm

APPARATUS, CONTROL METHOD, AND STORAGE MEDIUM TO INSTRUCT A FRAMEWORK TO STOP A TARGET APPLICATION BASED ON A USAGE AMOUNT OF A RESOURCE AND A TYPE OF THE TARGET APPLICATION

BACKGROUND OF THE INVENTION

1. Field of the Invention

The present invention relates to an apparatus that can install and execute an application, a control method, and a storage medium.

2. Description of the Related Art

Conventionally, an image forming apparatus, as typified by Multifunctional Embedded Application Platform (MEAP) (trademark of Canon Inc.), has been provided in which an application execution environment is installed, and an application can be installed and executed. Applications that can be installed into the MEAP include an authentication application for performing authentication of the image forming apparatus, in addition to normal applications.

In such an image forming apparatus, a size of a persistent storage area (non-volatile storage area such as a hard disk drive (HDD) and a flash read only memory (ROM)) that can be used by the application is previously determined, and each application uses the persistent storage area within a predetermined range.

In the MEAP, as described in Japanese Patent Application Laid-Open No. 2006-338268, a predetermined management file in each application declares a usage amount of the persistent storage area used by each application. In addition, a mechanism is also discussed in which, the application can be installed only when a total sum of sizes declared by each application does not exceed a range of a maximum usable size predetermined by the image forming apparatus.

On the other hand, as a solution when resources are depleted, Japanese Patent Application Laid-Open No. 2010-134871 discusses an information processing apparatus that notifies a user of resource depletion information.

However, under a specific condition, due to an operation difficulty of the application, a case may occur where the application uses the storage area more than the declared amount. For example, when an operation log of the application is accumulated and stored, recording is performed over the upper limit of the log size.

If such a situation is left unsolved, the resource of the image processing apparatus is depleted, and thus the image processing apparatus may not continue the operation normally. As another issue, if a function of performing notification after the resource has been depleted is provided, the image forming apparatus may be already in an unusable state when it is notified, and thus a user's work may be stopped for long hours.

In addition, the following issue is also conceivable. As a type of the application that can be installed into the image forming apparatus, in addition to the normal applications, an authentication application for performing user authentication for allowing a user to use the image forming apparatus is provided.

Since the authentication application is used to protect the entire image forming apparatus, the authentication application needs to be more appropriately operated compared with the normal applications. To prevent the image forming apparatus from being wrongly used, the authentication application needs to be differently operated from the normal applications.

The present invention is directed to provide an image forming apparatus that can solve at least one the issues described above.

SUMMARY OF THE INVENTION

According to an aspect of the present invention, an apparatus including an application framework for managing a life cycle of an application. The apparatus includes an instruction unit configured to, in response to receiving an installation instruction, instruct the framework to install a target application, an acquisition unit configured to acquire from the framework a declaration of a maximum value of a usage amount of a resource described in an application file corresponding to the target application, and a determination unit configured to determine a usage amount of a resource that is uniquely allocated to an application on installation of the application and used by the target application at predetermined timing, wherein, at a timing after the target application is installed, in a case where the determined usage amount of the resource used at the predetermined timing by the target application exceeds the declaration of the maximum value of the usage amount of the of the target application, the instruction means is configured to instruct the framework to stop the target application.

Further features and aspects of the present invention will become apparent from the subsequent detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates screens of application lists of an installer service 308.

FIG. 9 illustrates a setting screen of resource monitoring conditions.

FIG. 10 illustrates a setting screen of application stop processing.

DESCRIPTION OF THE EMBODIMENTS

Various exemplary embodiments, features, and aspects of the invention will be described in detail below with reference to the drawings.

Figure 1:
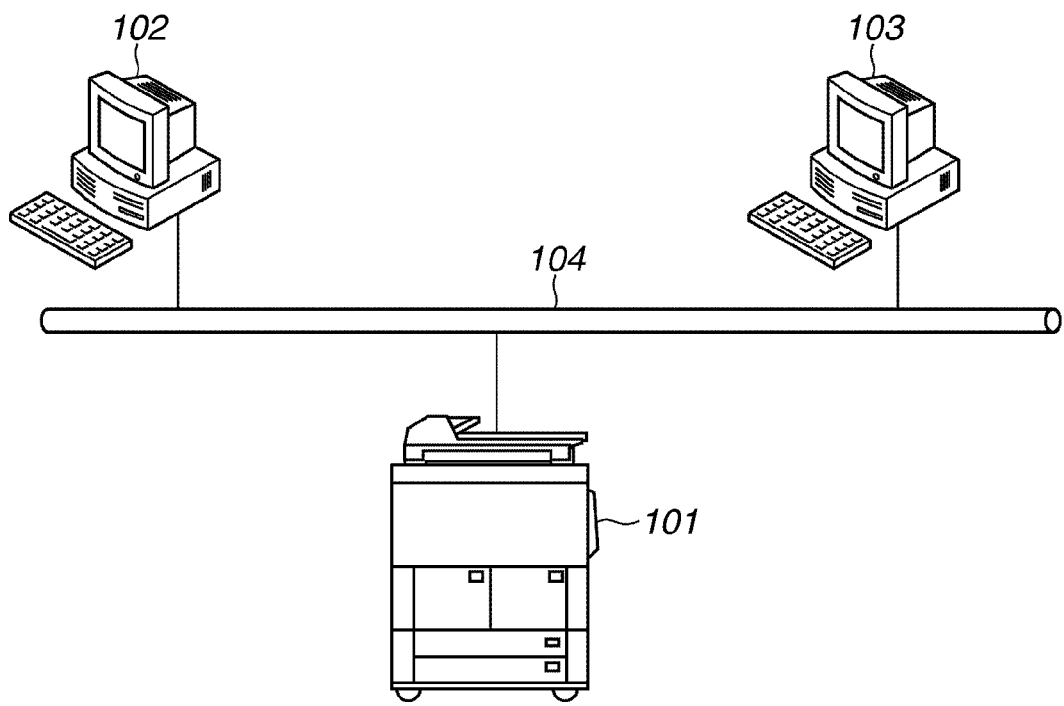
FIG. 1 illustrates a system configuration of an exemplary embodiment of the present invention.

According to a first exemplary embodiment, as illustrated in FIG. 1, an image forming apparatus 101 and personal computers (PC) 102 and 103 are communicably connected to a network 104

Figure 2:
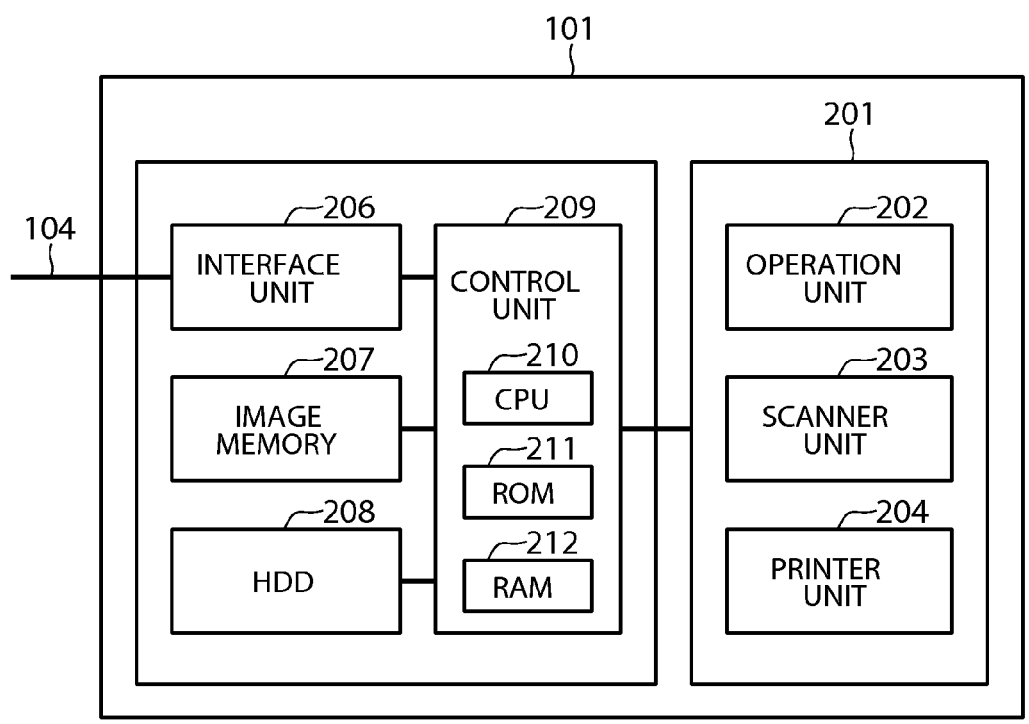
FIG. 2 is a block diagram illustrating an apparatus configuration of an image forming apparatus 101.

FIG. 2 is a block diagram illustrating an apparatus configuration of the image forming apparatus 101. A control unit 209 including a central processing unit (CPU) 210 controls the operations of the image forming apparatus 101. The CPU 210 reads a control program stored in a ROM 211 and executes various types of control processing such as reading control and transmission control. A random access memory (RAM) 212 is used as a temporary storage area such as a main memory and a work area of the CPU 210. An HDD 208 stores image data and various types of programs.

The control unit 209 is connected with a function unit 201 and controls operations of an operation unit 202, a scanner unit 203, and a printer unit 204. The operation unit 202 includes a liquid crystal display unit having a touch panel function and a keyboard. The control unit 209 controls each unit to provide a user with a service for issuing a job for the image forming processing and, according to a user's instruction, issues the job for the image forming apparatus and processes the issued job.

The scanner unit 203 reads an image on a document to generate image data, and inputs the image data into the control unit 209. The printer unit 204 prints the image data to be printed that is input from the control unit 209 on a recording medium. An interface unit 206 connects the control unit 209 with a local area network (LAN) 104 to receive image data to be printed from the PCs 102 and 103 on the network, or to transmit screen data read by the scanner unit 203.

A print image received from the PCs 102 and 103 is temporarily stored in an image memory 207, and then printed by the printer unit 204 via the control unit 209.

Figure 3:
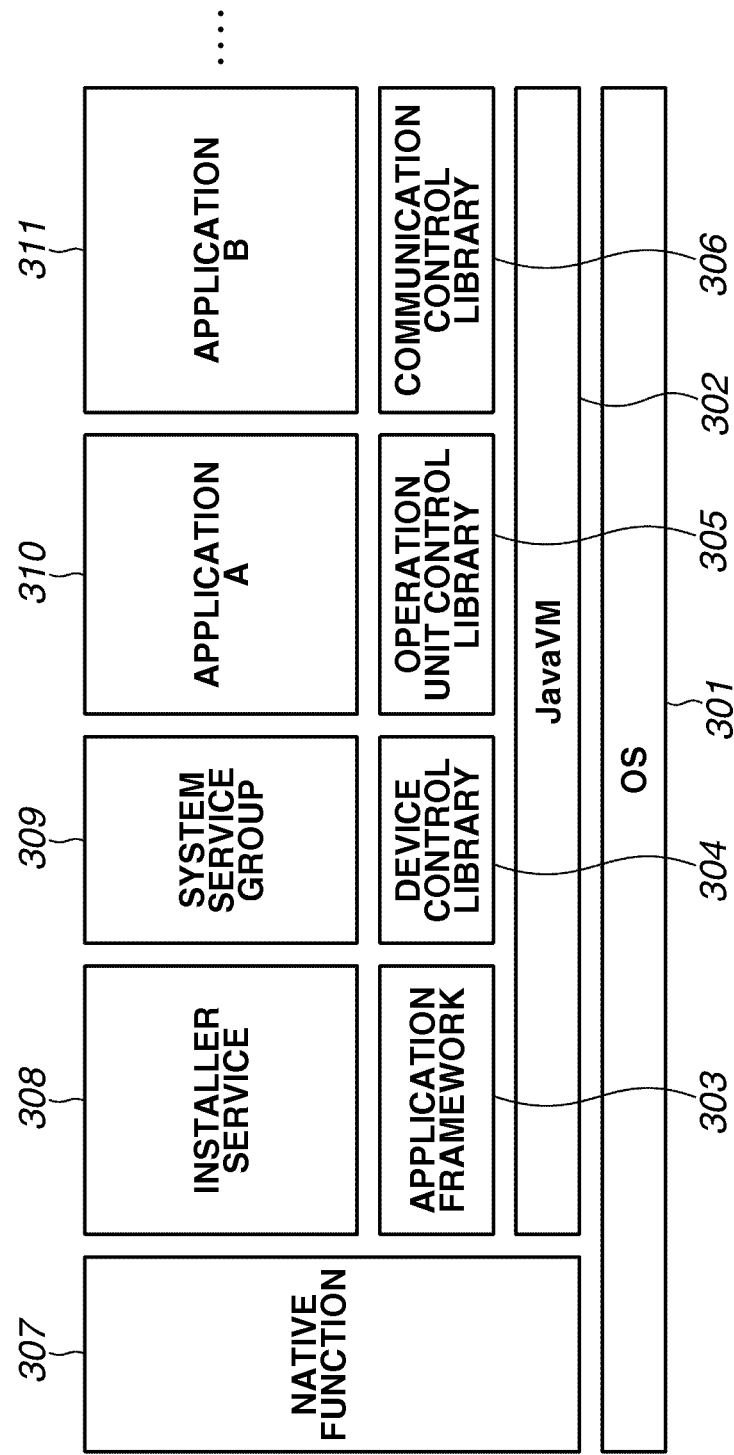
FIG. 3 illustrates a software configuration of the image forming apparatus 101.

FIG. 3 illustrates a software configuration stored in the HDD 208 of the image forming apparatus 101, which is an example of an image forming apparatus according to the present invention. The CPU 210 executes the above-described programs to realize various functions.

For an operating system (OS) 301, a real time OS is generally used, however these days, a general purpose OS such as Linux (registered trademark) may be used. JavaVM 302 is a virtual machine, which is represented by Java (registered trademark), provides an execution environment of the application.

An application framework 303 on the JavaVM 302 includes a function of managing a life cycle of a management target application which is operated on the JavaVM 302, and an interface (I/F) for controlling the function.

The life cycle indicates states of the application including installation, activation, stop, and uninstallation of the application. The application framework 303 according to the first exemplary embodiment is an Open Service Gateway Initiative (OSGi) (registered trademark) framework specified by the OSGi Alliance.

Management of the life cycle refers to performing on the application the appropriate processing corresponding to a changed state in a case where a state of the application is changed to anyone of the above-described states. For example, if the state of the application is changed to an activation state, the application framework 303 controls the application to activate, and when the state of the application is changed to an uninstallation state, the application framework 303 uninstalls the application. As described above, the application framework included in the JavaVM includes the function of managing the life cycle of the application.

The application framework manages the application based on a declaration value described in the application file described below. For example, the application framework performs management of association of an application name uniquely allocated to the application with a substance of the installed application, and management of version information about the installed application.

A device control library 304 running on the JavaVM 302 includes an I/F for enabling a user to use the image forming processing such as printing and scanning provided by a native function 307 from applications A and B described below. The I/F abstracts various functions provided by the image forming apparatus and is configured to enable another different image forming apparatus to realize the same function by the same procedure.

More specifically, the function provided by the image forming apparatus is converted to an object. A parameter is set for the object or an application programming interface (API) for acquiring the parameter from the object is called, so that various types of information can be set and acquired. In addition, the functions such as printing and scanning can be performed by calling the API according to a predetermined procedure.

With this arrangement, if the application is executed in an environment different from that of the OS 301, the native function of controlling the image forming apparatus can be used.

An operation unit control library 305 running on the JavaVM 302 includes a function of displaying an operation screen on the liquid crystal display unit of the operation unit 202 according to an instruction from the applications A and B described below or transmitting key input to each application, and an I/F for using the function.

A communication control library 306 running on the JavaVM 302 includes a function of communicating with other communication devices on the LAN 104 via the interface unit 206 and an I/F for using the function. A native function 307 is a collective term of software providing original functions of the image forming apparatus, such as scanning, copying, and printing of the document, and transmitting the image to the PC 102 using the operation unit 202.

The native function is a software group built in at a stage of manufacturing the image forming apparatus, and not installed according to a user's instruction. On the other hand, the application on the JavaVM can be installed according to a user's instruction, and can be managed and operated in a client environment.

As illustrated in FIG. 3, the native function 307 is the software running on the OS, and on the other hand, the applications such as an installer service 308 and the application A 310 is the software running on the JavaVM 302. A native unit corresponds to the native function 307.

The application or applications running on the JavaVM 302 also use the device control library 304 to perform the same device control in different image forming apparatus, and thus the image forming apparatus can be customized after the stage of manufacturing.

The application or applications running on the JavaVM 302 transmit various commands such as an image processing command to the native function 307 via the device control library 304, to cause the native function 307 to execute predetermined processing. Accordingly, even after the image forming apparatus is sold and installed in the client environment, a user who is a client can add an application, so that the user can use an image processing application providing further effective solutions.

Applications can be installed to improve the image forming apparatus, and thus various solutions can be provided for the user.

An installer service 308 performs installation processing by registering a plurality of applications such as the applications A and B described below into the application framework 303. An instruction to change the state of the application is transmitted from the installer service.

The installer service displays to the user a management screen on which the user can input an instruction to change the state of the application, and thus the user input an instruction to change the state of the application via the management screen. A system service group 309 provides various functions other than the installer service 308 to the application, however, the system service group 309 is not specifically described in detail in the present exemplary embodiment.

The installer service 308 and the system service group 309 are built into the image forming apparatus at the stage of manufacturing thereof, similarly to the native function 307. Applications 310 and 311 are installed by the installer service 308 and provide various functions on the image forming apparatus 101. The applications 310 and 311 can use the operation unit control library 305 and communicate with the user via the operation unit 202.

In addition, the applications 310 and 311 can receive data from the PC 102 via the interface unit 206 using the communication control library 306, and perform printing using the printer unit 204 via the device control library 304.

The installer service 308 can be accessed from a browser of the PCs 102 and 103 via the interface unit 206, and receives a predetermined application file using the communication control library 306. A screen for managing the application will be described with reference to FIG. 7 below.

Figure 4:
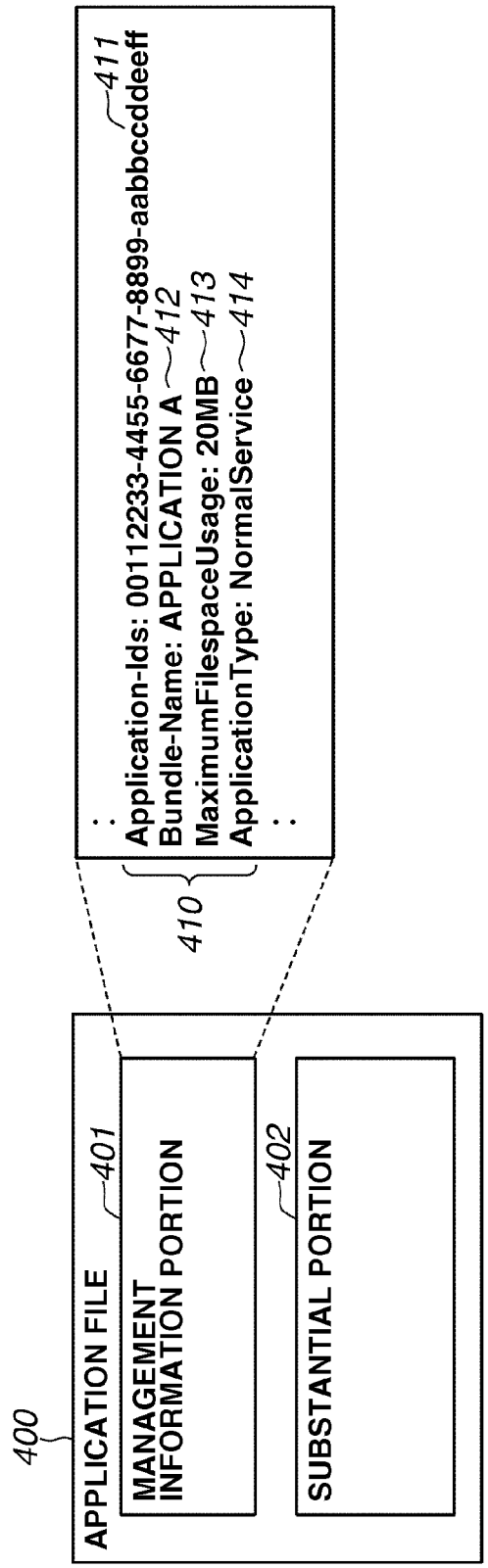
FIG. 4 illustrates a configuration of an application file 400.

FIG. 4 illustrates a configuration of an application file 400 of the application A 310 according to the present invention. A management information portion 401 typically includes MANIFEST.MF in the case of a program file of Java (registered trademark). A substantial portion 402 of the program of the application file 400 includes a file group having an extension of "class" in the case of the program file of the Java (registered trademark) is used.

Management information 410 in the management information portion 401 includes an attribute of the application or a declaration of specification. An identification (ID) 411 is used for uniquely identifying the application. According to the present exemplary embodiment, an individual universally unique identifier (UUID) is defined for each application. The application file 400 has an application name 412.

A maximum usage size 413 of the HDD 208 can be used by the application file 400 on the image forming apparatus 101. The management information portion in the application file is referred to as a manifest.

Based on the declaration described in the application file, the application framework 303 manages the application. More specifically the application framework 303 manages the application such that the attribute of the application or the declaration of the specification are stored and then information about the declaration is provided for an inquiry.

Identification information 414 is used for identifying a type of the application file 400. According to the present exemplary embodiment, the application A 310 installed by the installer service 308 includes information of "Normal Service".

The "Normal Service" indicates the application that is installed and executed in the client environment, and used by customizing the function provided by the image forming apparatus 101 from the operation unit 202 or the PC 102 via the browser. In other words, the "Normal Service" application can be installed when a user, for example a manager in the client environment, performs an operation to install the application. Accordingly, the image forming apparatus 101 can provide various solutions.

Services other than the "Normal Service" application include a "Login Service" indicating an authentication application and a "System Service" indicating the installer service 308 and the system service group 309 previously built into the image forming apparatus.

Such applications can be installed not by a user's operation but by a different, predetermined method. The predetermined method includes, for example, installation by a manufacturer at the stage of manufacturing, or installation by a salesperson who sells the image forming apparatus.

As described above, such an application is typically installed not by a client user who has purchased the image forming apparatus but by a user other than the client user. A parameter stored in the management information portion 401 is not limited to items described in the present exemplary embodiment.

Figure 5:
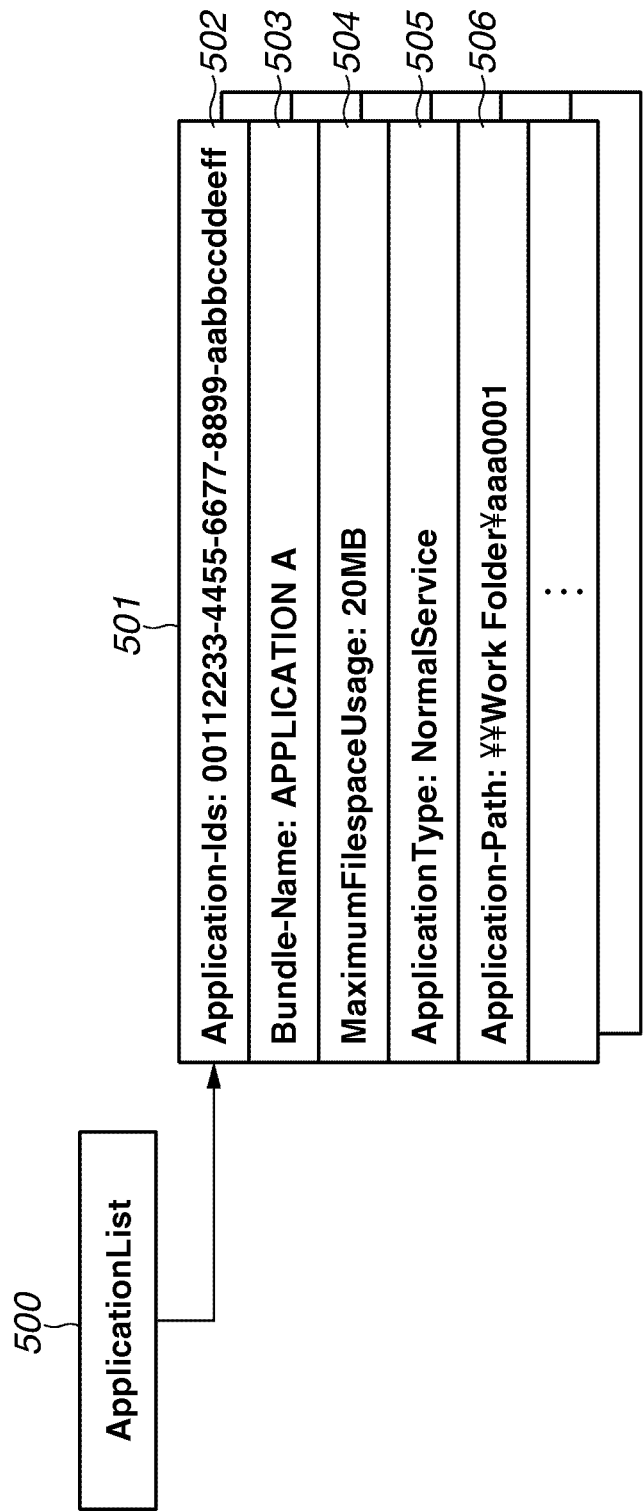
FIG. 5 illustrates an application list 500.

FIG. 5 illustrates an application list 500 acquired by the installer service 308 according to the present exemplary embodiment via the application framework 303.

The installer service 308 performs various types of control processing including determination of whether to install the application using the application file when installing the application, however when the specified processing is finished, the application file is discarded. Thus, if the installer service 308 confirms the declaration described in the application file, the application list 500 needs to be acquired from the application framework.

The application list 500 stores application objects in an array. In a first application object 501, information about the application A 310 is acquired according to the present exemplary embodiment.

Application identification information 502 corresponds to the ID 411. Application name information 503 corresponds to the application name 412. A maximum storage area size 504 corresponds to the maximum size 413. Application type information 505 corresponds to the identification information 414.

Path information 506 indicates a storage location in which the application is stored. The installer service 308 can acquire the above-described information pieces from the application object using a predetermined acquisition API.

Figure 6:
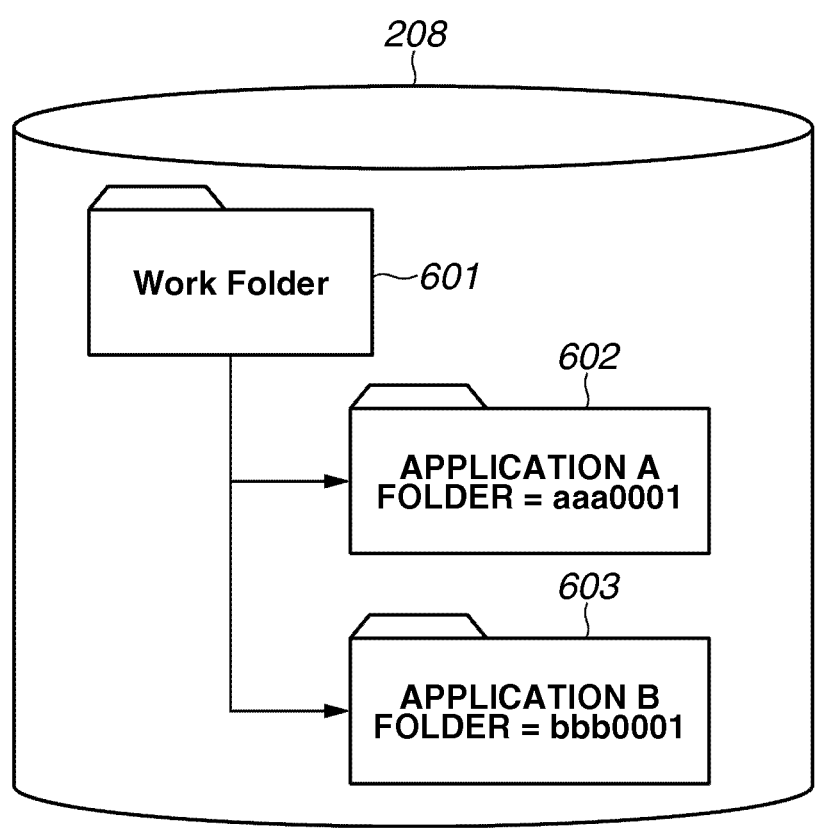
FIG. 6 illustrates a storage state of an application.

FIG. 6 illustrates a state that the application framework 303 according to the present exemplary embodiment stores the applications A and B installed according to an instruction of the installer service 308.

According to the present exemplary embodiment, a work folder 601 in the HDD 208 is allocated to the application framework 303, and the application framework 303 can use a folder beneath the work folder 601. The folder allocated to the application framework 303 may be determined by the user or previously determined.

The application framework 303 installs the application according to an instruction of the installer service 308. At this point, in the work folder 601 of the HDD 208, folders 602 and 603 independent for each application are generated using the I/F of the OS 301.

In other words, the application is installed, and then the resource is uniquely allocated to the application. The application file 400 and the like are stored in the above-described folders.

According to the present exemplary embodiment, each application can freely generate folders and files only in the folders 602 and 603 in which the application is installed. According to the present exemplary embodiment, the maximum size of the HDD 208 that can be used by the application is an allowable size of the work folder 601.

When the application is installed in the image forming apparatus, the installer service 308 controls the installation instruction such that a total of the maximum usage sizes 413 declared by the individual applications does not exceed the size allowed by the work folder 601.

For example, it is supposed that a persistent storage area where the application can be installed is 1 giga byte (GB), and the persistent storage area currently used by a plurality of applications is 800 megabyte (MB). In such a case, when a target application to be installed exceeds 200 MB, the installer service 308 does not issue the installation instruction, and when the application does not exceed 200 MB, the installer service 308 issues the installation instruction.

Each application to be installed is installed supposing that the resource is used within a declaration value declared in the application file corresponding to each application. For example, when the declaration value of the maximum usage amount of the HDD of the application A is 100 MB, the application A is allowed to use 100 MB and installed.

In other words, when the total of the declared maximum value and the resource amount currently used by the application is less than the maximum value previously allocated to all applications running on the application executing environment, the installation is allowed.

However, a case is conceived where the HDD amount used by the specific application exceeds the maximum usage amount declared by the application file. This is a state where the declaration value relating to the usage of the resource in the application file is used when the application is installed, however, the declaration value is not strictly adhered to when the application framework manages the application.

The application framework performs the management to associate the application name and version information in the application file, and the substance of the installed application with one another. However, the application framework manages the declaration value related to the usage of the resource in the application file, but does not include a function of controlling the operation of the application according to the declaration value.

Thus, if a capacity of the work folder 601 used by the application exceeds the declaration value allowed by the installer service 308, the operation of the image forming apparatus 101 may become unstable. Further, a situation that the image forming apparatus 101 stops the operation may occur.

FIG. 7 illustrates screens of application lists provided by the installer service 308 according to the present exemplary embodiment, and the screens are viewed from a browser on the PC 102.

The lists in FIG. 7 are displayed when the user accesses the installer service 308 from the browser on the PC 102. A screen 700 is a screen in a normal state, and the installer service 308 forms the screen according to the application list 500 acquired via the application framework 303.

A state 701 indicates a current state of the application in the life cycle of the application acquired via the I/F of the application framework 303. A disk usage amount 702 for each application indicates the usage amount of the folder storing the application by the path information 506 and the function of the OS 301 at a predetermined timing.

A Maximum disk usage 703 is information indicating an upper limit of disk usage which is displayed by acquiring information in the application information 504 via the application framework 303. A screen 704 is a screen of the installer service 308 displayed when overuse of the resource is detected according to the present exemplary embodiment.

A state 705 indicates the state of the application, which indicates that the application A is stopped due to the "resource over" according to the present exemplary embodiment. A disk usage amount 706 for each application indicates the current usage amount, similarly to the disk usage amount 702. As items to be displayed on the application list screen, other items than those illustrated in FIG. 7 of the present exemplary embodiment may be displayed. In addition, to get the user to recognize that the application is stopped because the usage resource exceeds the declaration, a symbol for recognizing the state of the application may be displayed.

Figure 8:
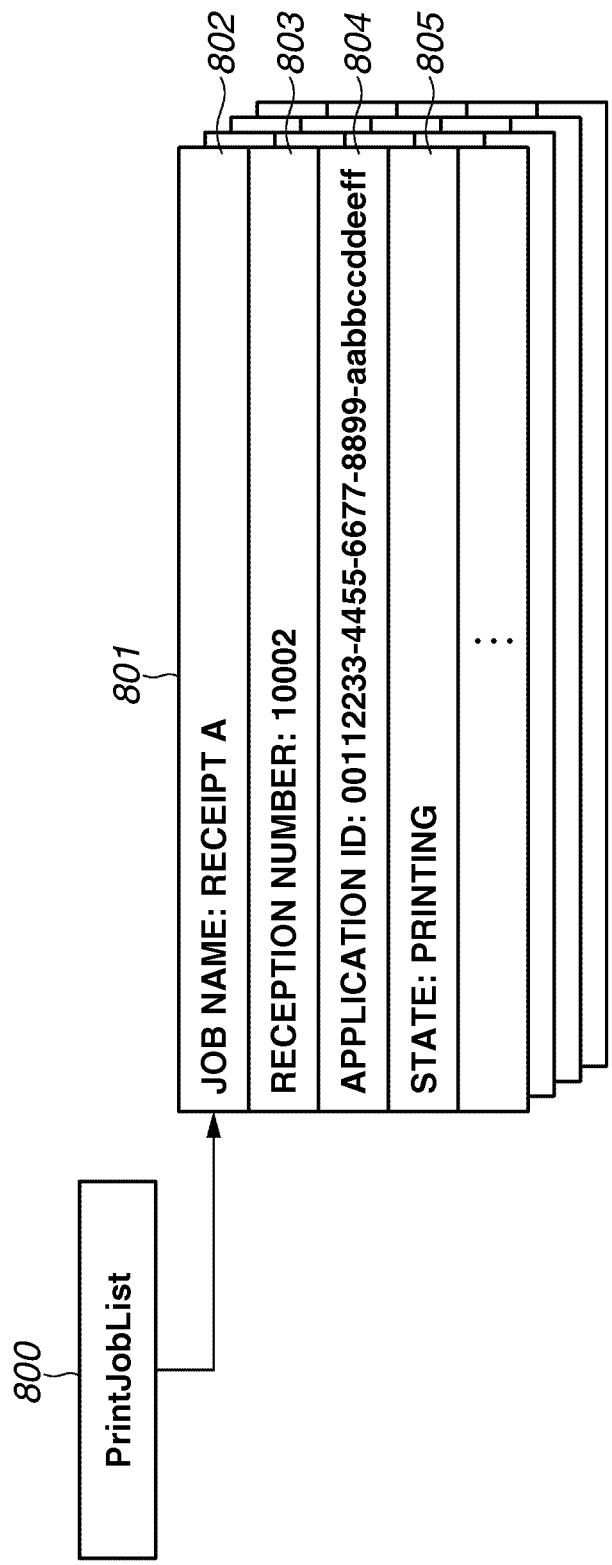
FIG. 8 illustrates a job list.

FIG. 8 illustrates a job list acquired by the installer service 308 via the device control library 304 according to the present exemplary embodiment.

A job list 800 stores job objects set in an array. According to the present exemplary embodiment, it is assumed that the application A 310 performs a printing job. A first job object 801 includes various parameters for characterizing the job.

A parameter 802 indicates a job name. A job reception number 803 is given by the native function 307. The native function 307 gives different numbers to the jobs, each time it receives various jobs. Application identification information 804 is used for identifying the application that performs the printing job 801.

A state 805 of the print job 801 indicates that the print job 801 is in operation according to the present exemplary embodiment. The parameter of the job is not limited to the example illustrated in FIG. 8 of the present exemplary embodiment, and may include other parameters such as a sheet size and an output method.

FIG. 9 illustrates a resource monitoring condition setting screen 901 in a setting screen 900 for various conditions in the installer service 308 according to the present exemplary embodiment, and the resource monitoring condition setting screen 901 is viewed from the browser on the PC 102. The setting screen in FIG. 9 is displayed when the user accesses the installer service 308 from the browser on the PC 102.

An item 902 indicates processing to be performed when the overuse of the resource ("resource over") occurs in the application A, and the processing is set to immediately stop the operation of the application when the "resource over" is detected. An item 903 indicates processing to be performed when the "resource over" occurs in the application B, and the processing is set to immediately stop the operation of the application, similarly to the application A. An item 904 is used to set a monitoring period. According to the present exemplary embodiment, the setting indicates that monitoring is performed "once/day", namely once a day.

The resource monitoring condition is not limited to the contents in FIG. 9 of the present exemplary embodiment. For example, a specific amount may be specified, or the monitoring period may be input with numeral values. In addition, the set information is stored in a predetermined area in the HDD 208. As described above, a method for setting the monitoring date and time and the monitoring conditions is not limited.

FIG. 10 illustrates a setting screen 1001 for processing performed when the application is stopped due to the "resource over" in a setting screen 1000 for various conditions in the installer service 308 according to the present exemplary embodiment, and the setting screen 1001 is viewed from the browser on the PC 102.

The setting screen in FIG. 10 is displayed when the user accesses the installer service 308 from the browser on the PC 102. An item 1002 is used to set how to control a copy job when the "resource over" of the application is detected, and whether to cancel or continue the copy job can be set. An item 1003 is used to set how to control a printing job when the "resource over" of the application is detected, and whether to cancel or continue the print job can be set.

An item 1004 is used to set how to control a scanning job when the "resource over" of the application is detected, and according to the present exemplary embodiment, the cancel is selected. According to the present exemplary embodiment, a reason why only copy job and printing job include an option of "continue" is that, in a copy function and a printing function, the application is less likely to store data involved in printing in the work folder 601.

On the other hand, in a scanning function, a scanned image is likely to be subjected to processing such as transmission or image conversion, and thus the scanned image may be stored in the work folder 601. In order to prevent the application that has been already stopped from using the resource any more, specifications of the resource are controlled according to a type of the issued job. The set information is stored in a predetermined area in the HDD 208.

Figure 11:
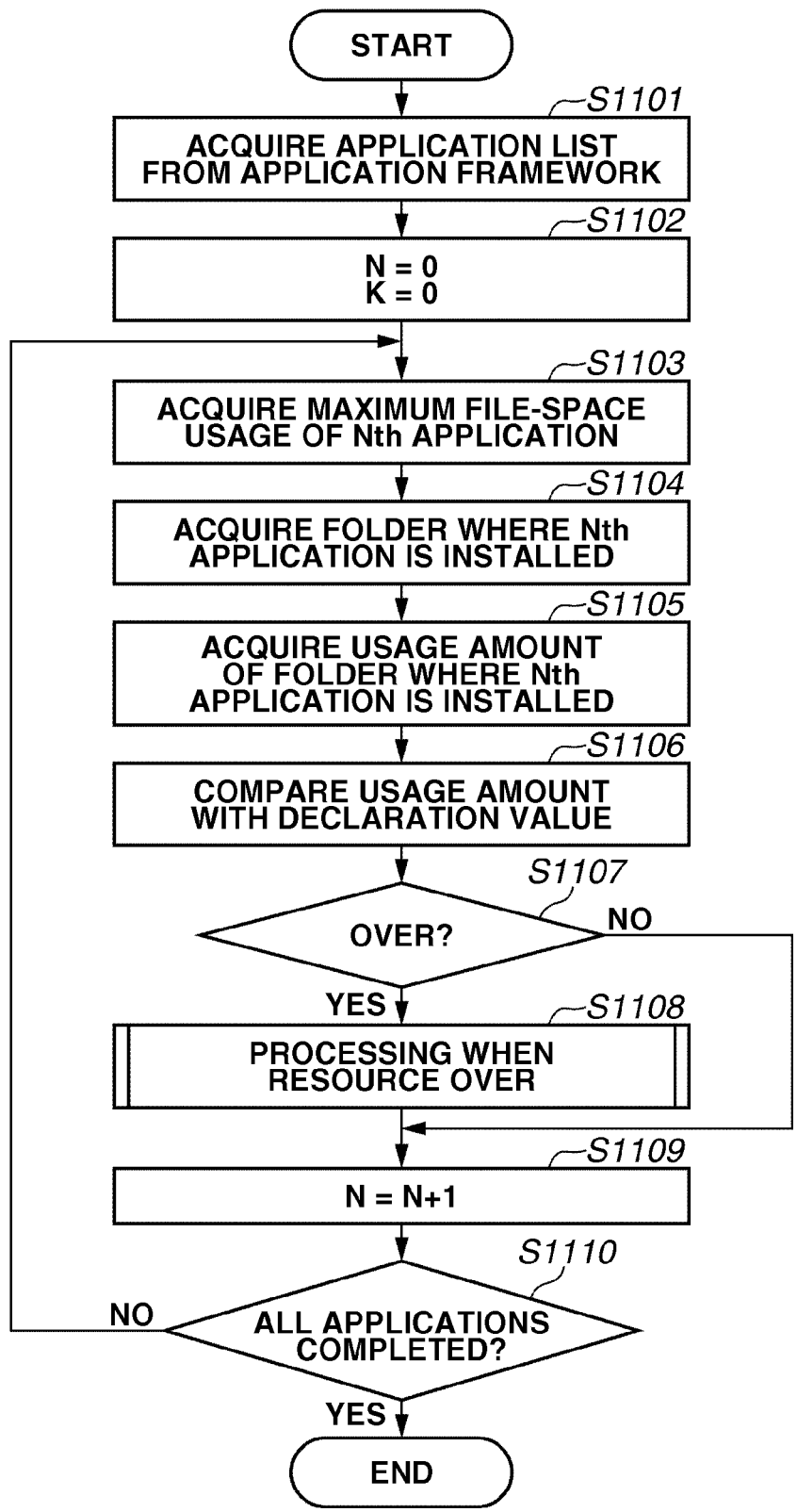
FIG. 11 is a flowchart of processing performed for resource monitoring.

FIG. 11 is a flowchart illustrating processing performed when the installer service 308 according to the present exemplary embodiment monitors the resource based on the information set by the monitoring period 904. The processing is executed at the timing after a target application to be installed is installed.

Further, the timing is set by the monitoring period 904. As described above, it is apparent that the present invention is directed to the image forming apparatus configured to restrict a wrong operation of the installed application and avoid being in an inappropriate state.

Figure 12:
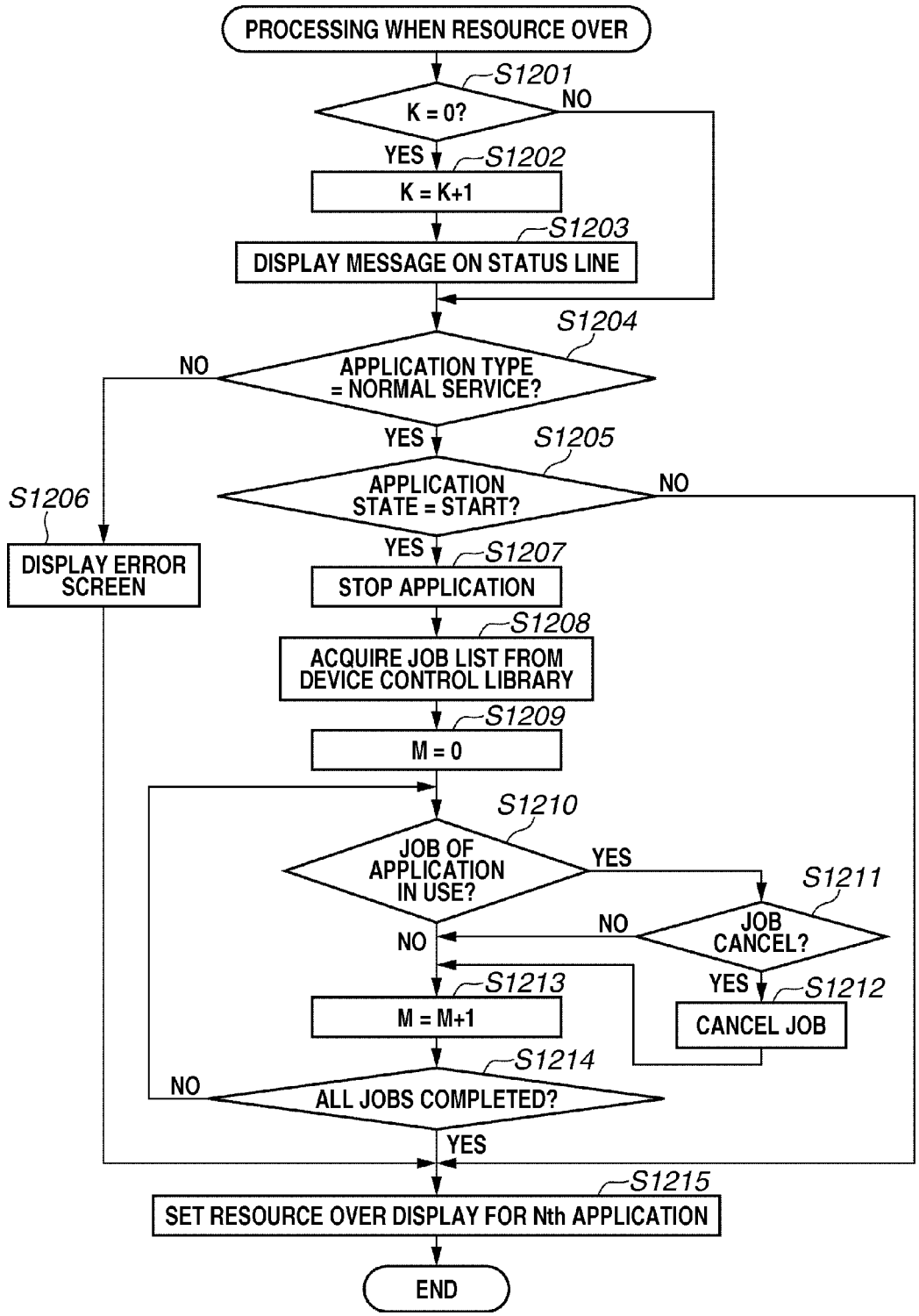
FIG. 12 is a flowchart of processing performed when resource over is detected.

In step S1101, the installer service 308 acquires all application lists 500 existing on the JavaVM via the application framework 303. In step S1102, a parameter N for checking all objects in the application list 500 acquired in step S1101 and a parameter K for checking the number of times of executions of the flowchart illustrated in FIG. 12 are initialized.

In step S1103, the installer service 308 acquires the maximum storage area size 504 of an N-th application via the application framework 303. According to the present exemplary embodiment, as the N=0-th application, information about the application A 310 is used.

In step S1104, the installer service 308 acquires the path information 506 about the N-th application, which is the application A 310, via the application framework 303.

According to the present exemplary embodiment, information specifying the application folder 602 is acquired. As illustrated in FIG. 6, according to the present exemplary embodiment, since each application is stored in the different folder, the different path information can be acquired for each application.

In step S1105, the installer service 308 acquires a current usage amount of the folder indicated by the path information 506 acquired in step S1104 via the OS 301 to acquire a current HDD consumption amount of the application A 310. The installer service 308 acquires the usage amount of the folder indicated by the path information 506 acquired in step S1104 and confirms the usage amount of the resource currently used by the installed target application.

The timing for acquisition is a predetermined timing, and may be the same timing as that set by the monitoring period 904 or may be different therefrom. Thus, the amount of the resource used by the application can be acquired at an earlier timing than the timing set by the monitoring period 904. As described above, the timing for acquiring the resource usage amount is not limited.

In step S1106, the installer service 308 compares a size acquired in step S1103 with that in step S1105. However, the data to be compared is adjusted according to the resource monitoring condition 902 of the application or the setting in the item 903.

In step S1107, a result of the comparison performed in step S1106 is evaluated. When it is determined that the resource is over (YES in step S1107), the processing proceeds to step S1108. When it is determined that the resource is not over (NO in step S1107), the processing proceeds to step S1109.

In step S1108, the installer service 308 performs processing of when the "resource over" is detected. With reference to FIG. 12, the processing performed on the application in step S1108 will be described in detail. In step S1109, the parameter N is added for checking a subsequent application in the application list 500 acquired by the installer service 308 in step S1101.

In step S1110, it is determined whether the check is completed on all items in the application list 500 acquired in step S1101. When it is determined that the check is completed (YES in step S1110), the processing in the flowchart is ended. When it is determined that the check is been completed (NO in step S1110), the processing returns to step S1103, and the resource monitoring is performed on the subsequent application.

FIG. 12 is a flowchart illustrating details of the processing in step S1108. In step S1201, the number of times of executions of the processing in this flowchart is confirmed, and the parameter K that is initialized in step S1102 is checked. In step S1201, when it is determined that the processing is performed for a first time (YES in step S1201), the processing proceeds to step S1202. If it is not the first time (NO in step S1201), the processing proceeds to step S1203.

In step S1202, the parameter K is added. In step S1203, the installer service 308 outputs a message to be indicated on a message 1301 illustrated in FIG. 13 onto a liquid crystal panel of the operation unit 202 via the operation unit control library 305.

In step S1204, the installer service 308 determines the type information 505 of the application. More specifically, the installer service 308 determines whether the content acquired via the application framework 303 coincides with the "Normal Service". As a result of determination, if the content coincides with the "Normal Service" (YES in step S1204), the processing proceeds to step S1205. If the content does not coincide with the "Normal Service" (NO in step S1204), the processing proceeds to step S1206.

In step S1205, the installer service 308 determines whether the application has already been started, or is in operation. When it is determined that the application has been started (YES in step S1205), the processing proceeds to step S1207.

When it is determined that the application has not been started (NO in step S1205), the processing proceeds to step S1215.

Figure 14:
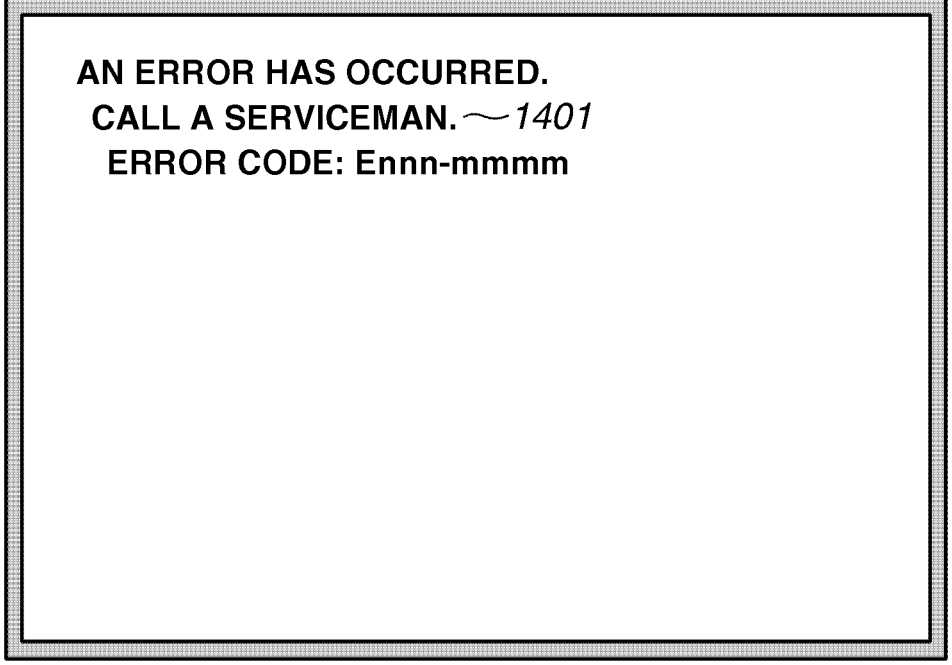
FIG. 14 illustrates an error screen of the image forming apparatus.

In step S1206, the installer service 308 displays an error screen illustrated in FIG. 14 on the liquid crystal display unit of the operation unit 202 via the operation unit control library 305. A number displayed in an error code 1401 illustrated in FIG. 14 is changed according to the content of the application type information 505.

The error screen displays an error code to be notified to a repair company (repair vendor) that repairs the image forming apparatus. A repair worker of the repair company who is notified the error code can understand the state of the image forming apparatus owned by the client user and appropriately repairs the image forming apparatus.

In S1207, the installer service 308 stops the application via the application framework 303. More specifically, the installer service 308 instructs the application framework 303 to stop, and the application framework 303 performs processing dealing with the stop state in response to the application shifting to the stop state.

In step S1208, the installer service 308 acquires the job list 800 in operation from the native function 307 via the device control library 304. In step S1209, the parameter for confirming the job list 800 acquired in step S1208 is initialized.

In step S1210, the installer service 308 determines whether the application identification information 804 coincides with the application from an M-th job in the job list acquired in step S1208. More specifically, similarly to step S1103, the application identification information 502 of the application A 310 is compared with the application identification information 804 of the job object 801. When it is determined that the application identification information 804 coincides with the application (YES in step S1210), the processing proceeds to step S1211. When it is determined that the application identification information 804 does not coincide with the application (NO in step S1210), the processing proceeds to step S1213.

In other words, it is determined whether the job issued by the target application that is instructed to stop in step S1207 is included.

In step S1211, the installer service 308 determines whether to cancel the job, and determines setting content of the set item 1002 stored in a predetermined region in the HDD 208. As a result, when it is determined to cancel the job (YES in step S1211), the processing proceeds to step S1212. When it is determined not to cancel the job (NO in step S1211), the processing proceeds to step S1213.

In step S1212, the installer service 308 cancels the job via the device control library 304. More specifically, when it is determined that the application identification information 804 coincides with the application in step S1210, the installer service 308 issues an instruction to stop the processing on the job issued by the target application instructed to stop.

In step S1213, to perform processing on a subsequent job in the job list acquired in step S1208, a parameter M is added.

In step S1214, the installer service 308 determines whether confirmation of all the jobs acquired in step S1208 is completed. When it is determined that confirmation of all the jobs is completed (YES in step S1214), the processing proceeds to step S1215. When it is determined that confirmation of all the jobs is not completed (NO in step S1214), the processing returns to step S1210, and performs the processing on a subsequent job.

In step S1215, the installer service 308 sets a message indicating stoppage of the job due to the "resource over" in a column for the state of the application in an application list 704.

A reason why, if the application type information 505 indicates a "Long Service" in step S1204, the same processing as that of the "System Service" is performed is that the authentication application is directed to protection of the image forming apparatus.

More specifically, it is because, if the "Long Service" and the "Normal Service" are treated as the same and the application is stopped, the user cannot be authenticated, which may cause a problem in security. According to this processing, if the problem occurs in the authentication application, the security of the image forming apparatus can be maintained.

Figure 13:
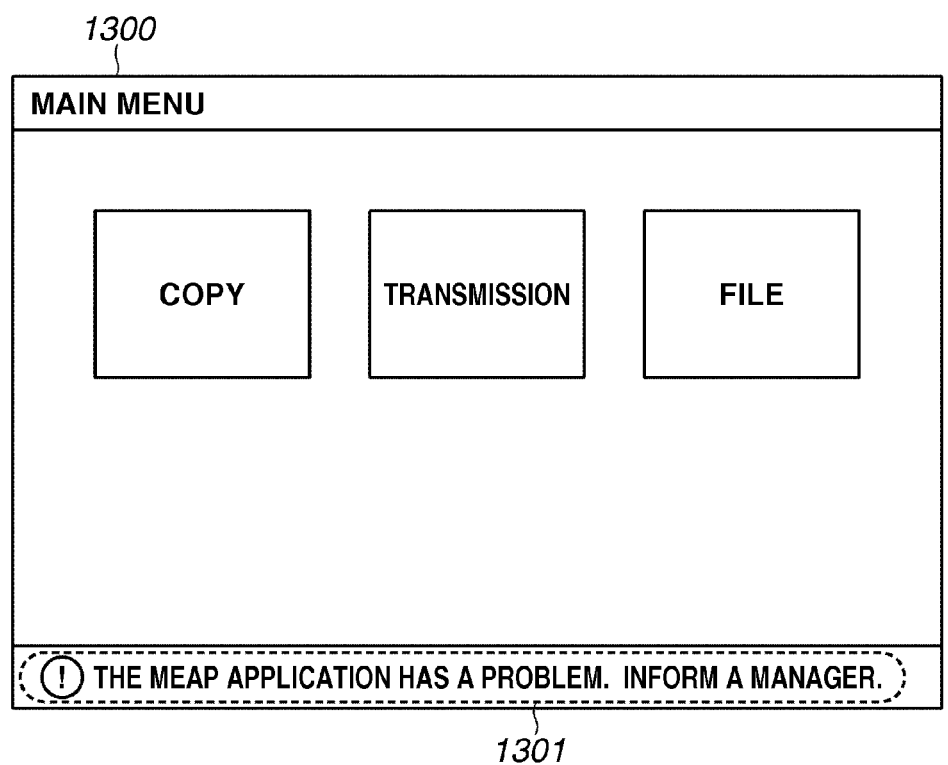
FIG. 13 illustrates an operation screen of the image forming apparatus.

FIG. 13 illustrates an operation screen 1300 of the image forming apparatus according to the present exemplary embodiment. A message 1301 is displayed by the processing in step S1202.

FIG. 14 illustrates an error screen displayed on the operation screen of the image forming apparatus according to the present exemplary embodiment, and the error screen 1400 indicates that the "resource over" is detected in step S1205 in the application of which application type information 505 is other than the "Normal Service".

According to the first exemplary embodiment, when the usage amount of the resource of the application exceeds the declaration, the image forming apparatus is immediately stopped. However, stoppage of the application may stagnate office operations. Thus, according to a second exemplary embodiment, the image forming apparatus can be used without stopping the application as possible as it can.

Figure 15:
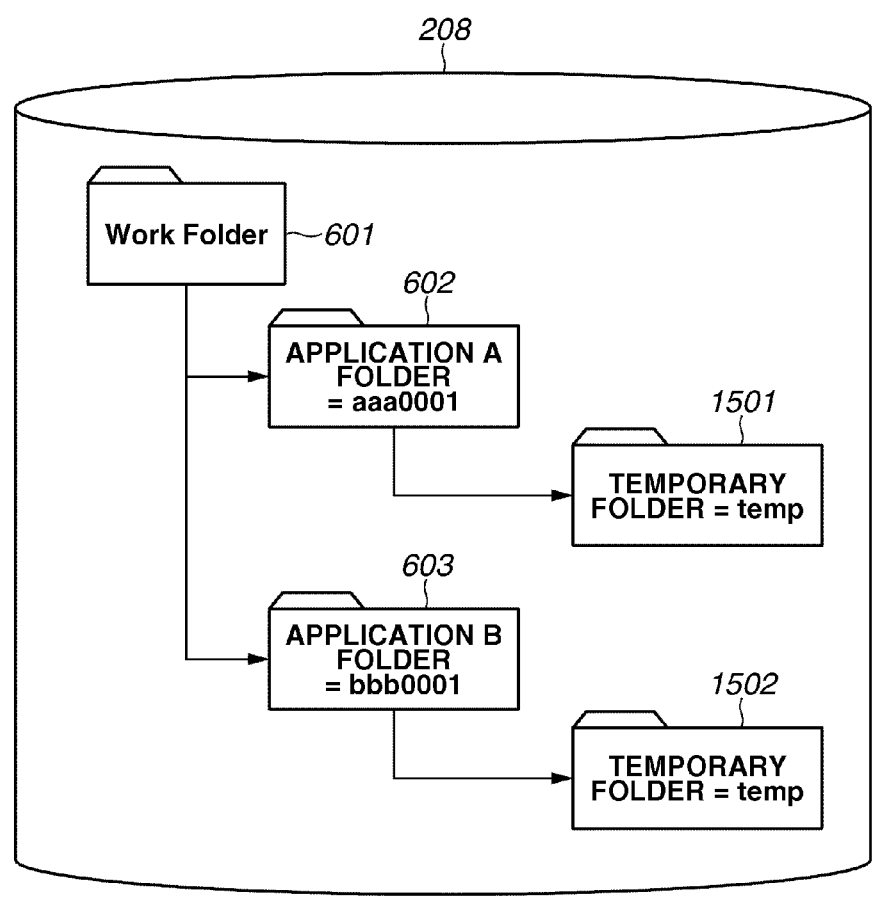
FIG. 15 illustrates a storage state of an application according to a second exemplary embodiment.

According to the second exemplary embodiment, as illustrated in FIG. 15, when the installer service 308 installs an application, temporary folders 1501 and 1502 having predetermined names are generated. Then, the application stores a file to be temporarily used in the temporary folders 1501 and 1502.

Figure 16:
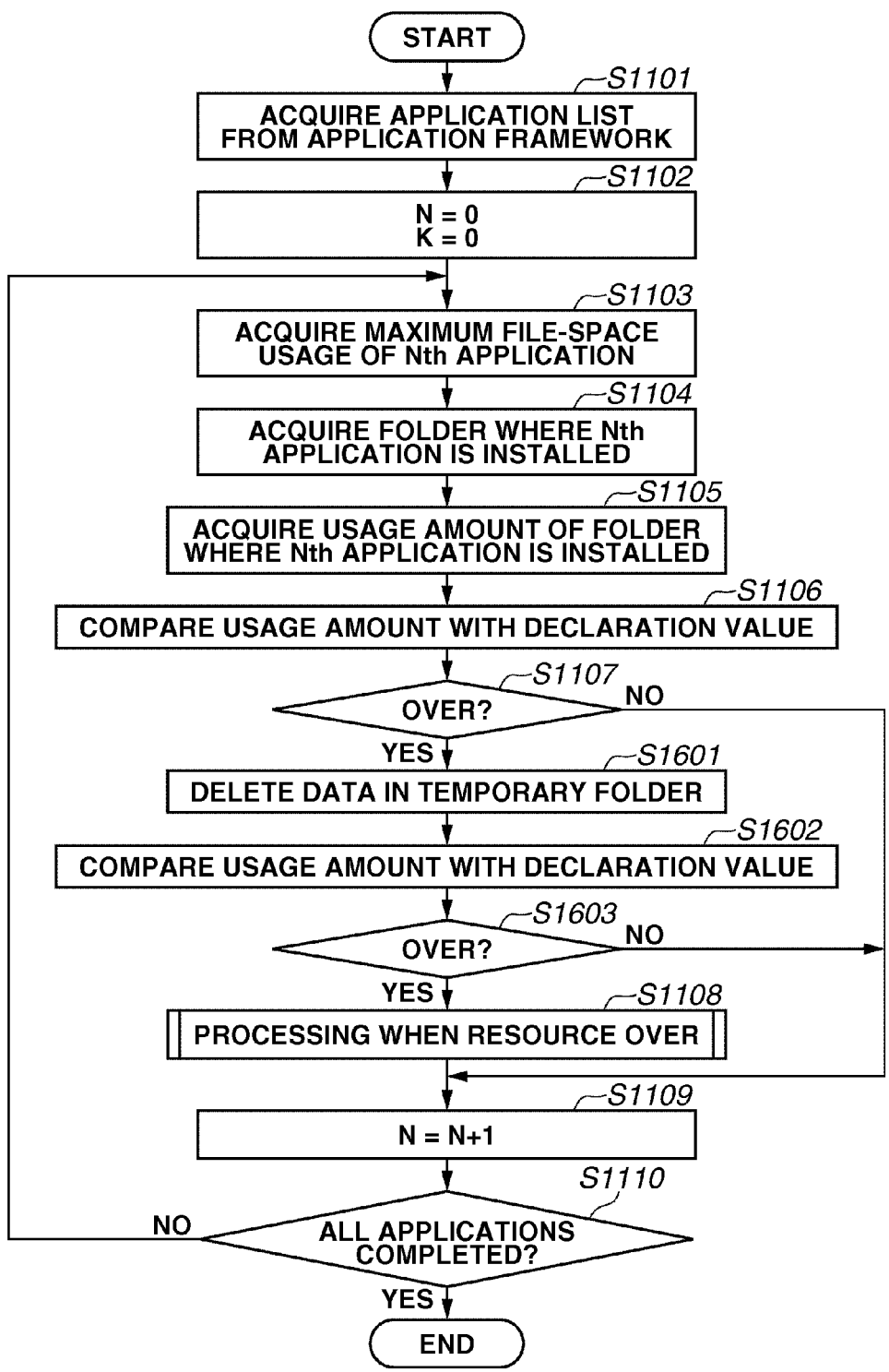
FIG. 16 is a flowchart of processing performed for resource monitoring according to the second exemplary embodiment.

FIG. 16 is a flowchart in which a method described in the second exemplary embodiment is added to the flowchart illustrated in FIG. 11, and processing after determination of "resource over" in step S1107 is changed.

In step S1601, the installer service 308 deletes file data in the temporary folder 1501 or 1502 of the application. In step S1602, the installer service 308 performs the same processing as in step S1106 to compare a newly acquired usage amount with the declaration value.

In step S1603, a result of the comparison performed in step S1602 is evaluated. When it is determined that the resource is over (YES in step S1603), the processing proceeds to step S1108. When it is determined that the resource is not over (NO instep S1603), the processing proceeds to step S1109.

According to the second exemplary embodiment, if the application accidentally causes the "resource over", and if it happens in the file in the temporary folder, the application can be automatically restored.

According to the first exemplary embodiment, the function is provided by the installer service 308 previously built into the image forming apparatus. However, a configuration for solving the problem of the present invention without updating the installer service 308 will be described in a third exemplary embodiment.

According to the third exemplary embodiment, the function realized in the installer service 308 according to the first exemplary embodiment is provided as a normal application. More specifically, an application described in the third exemplary embodiment includes the application list function illustrated in FIG. 7, the resource monitoring condition setting function and the monitoring period setting function illustrated in FIG. 9, and the job control setting illustrated in FIG.

Figure 18:
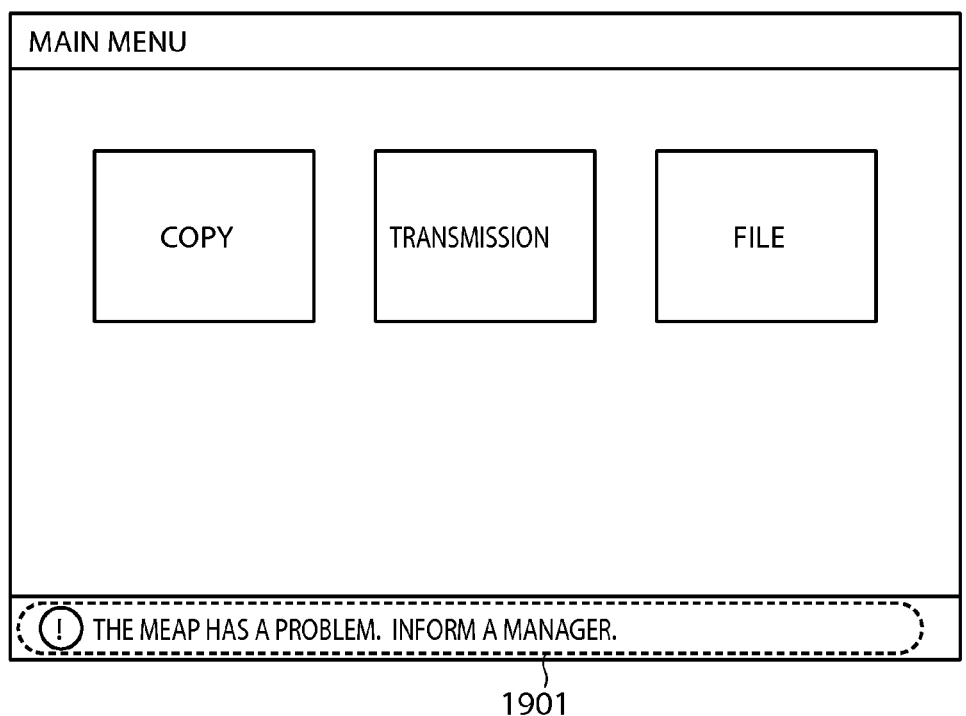
FIG. 18 illustrates an error message display screen according to the third exemplary embodiment.

10. Further, in place of the installer service 308, the application performs the processing in the flowcharts illustrated in FIGS. 11 and 18.

Figure 17:
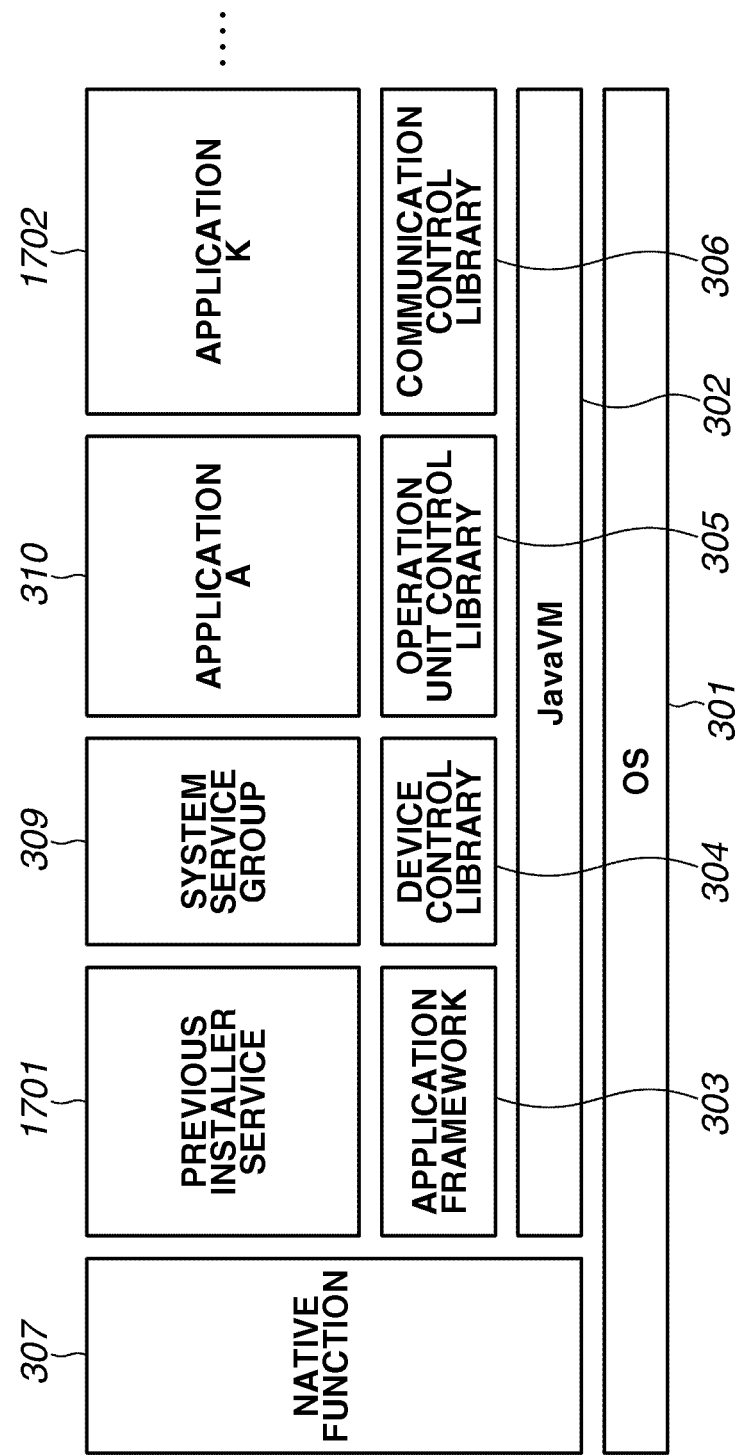
FIG. 17 illustrates a software configuration of an image forming apparatus 101 according to a third exemplary embodiment.

FIG. 17 illustrates a relationship between the image forming apparatus already exists in the market and an application K according to the third exemplary embodiment. An installer service 1701 has a conventional specification and none of the functions as described in the first and second exemplary embodiments of the present invention. An application K 1702 is a resource monitoring application according to the third exemplary embodiment.

According to the third exemplary embodiment, in place of the processing in step S1206 illustrated in FIG. 12, the processing in step S1801 is adopted. In step S1801, the application K 1702 displays an error message 1901 indicated in a status line in FIG. 18 via the operation unit control library 305.

According to the third exemplary embodiment, without changing the installer service 1701 previously built into the image forming apparatus, the resource monitoring function equivalent to that of the first and second exemplary embodiments can be realized. Therefore, in the image forming apparatus that has been already sold, when the installer service 1701 is installed and executed as a normal application, the effect equivalent to that of the first exemplary embodiment can be acquired.

Each exemplary embodiment of the present invention is described by targeting on the usage amount of the persistent storage area used by the application. As another exemplary embodiment, the present invention can be applied to a usage amount other than the usage amount of the persistent storage area used by the application.

In the management information 410 of the application file 400, the usage amount of the resource in the image forming apparatus such as the usage amounts of the CPU and the memory can be declared. Further, the installer service 308 can acquire information about the target application installed according to an installation instruction from the application framework 303 in addition to the usage amount of the persistent storage area used by the application.

For example, the usage amounts of the CPU and the memory used by the application can be acquired. Based on the acquired information, the flow of processing for the "resource over" illustrated in FIG. 12 is performed to deal with the usage amounts of entire resources of the image forming apparatus, such as the usage amounts of the persistent storage area, the CPU, and the memory.

Accordingly, more accurate application control can be performed. Further, such information pieces can be combined with each other. More specifically, both the usage amounts of the persistent storage area and the memory can be confirmed by the processing. In such a case, advanced control for stopping the operation of the application when any one of the usage amounts exceeds the declared amount can be performed, and thus advanced application control can be performed.

In each exemplary embodiment of the present invention, the image forming apparatus is described as the apparatus to which the present invention is applied. The image forming apparatus, as illustrated in FIG. 2, includes both the scanner unit and the printer unit and processes a job related to the image forming processing using one of or both of these image forming units.

However, the image forming apparatus includes the apparatus provided with either one of the image forming units, or the apparatus provided with the image forming unit of other type. Such an apparatus processes a job related to the image forming processing with use of the image forming unit provided therein. Further, the present invention can be applied to an apparatus other than the image forming apparatus.

For example, the present invention can be applied to smart phones, personal computers, and other apparatuses. In a case of such apparatuses, a job is not always related to the image forming processing. Therefore, the present invention can be applied to any type of jobs processed by the apparatus.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

It will be understood that the present invention has been described above purely by way of example, and modification of detail can be made within the scope of the invention. Each feature disclosed in the description, and (where appropriate) the claims and drawings may be provided independently or in any appropriate combination.

This application claims priority from Japanese Patent Application No. 2012-006202 filed Jan. 16, 2012, which is hereby incorporated by reference herein in its entirety.

What is claimed is:

1. An apparatus including an application framework for managing a life cycle of an application, the apparatus comprising:

a processor; and a non-transitory computer readable medium including instructions stored thereon that, when executed by the processor, cause the processor to provide an instruction unit, an acquisition unit, a determination unit, and an application determination unit;

the instruction unit configured to, in response to receiving an installation instruction, instruct the framework to install a target application;

the acquisition unit configured to acquire from the framework a declaration of a maximum value of a usage amount of a resource described in an application file corresponding to the target application;

the determination unit configured to determine a usage amount of a resource that is uniquely allocated to an application on installation of the application and used by the target application at predetermined timing;

the application determination unit configured to determine whether a type of the target application is an application of Normal service that is not an authentication application;

wherein, at a timing after the target application is installed, in a case where the determination unit determines that the determined usage amount of the resource used at the predetermined timing by the target application exceeds the declaration of the maximum value of the usage amount of the target application, and the application determination unit determines that the type of the target application is the application of Normal service that is not the authentication application, the instruction unit is configured to instruct the framework to stop the target application, wherein, at a timing after the target application is installed, in a case where the determination unit determines that the determined usage amount of the resource used at the predetermined timing by the target application exceeds the declaration of the maximum value of the usage amount of the target application, and wherein, before the instruction unit instructs the framework to stop the target application or the apparatus to display the error screen, the apparatus displays a message indicating the target application has a problem on a status line.

2. The apparatus according to claim 1, wherein the usage amount of the resource is a memory usage amount of a folder, wherein the acquisition unit is configured to acquire a declaration about a maximum value of a memory usage amount of the folder described in the application file corresponding to the target application, and wherein the determination unit is configured to determine the usage amount of the folder consumed when the target application is in operation.

3. The apparatus according to claim 1, wherein the apparatus is an image forming apparatus including a scanner unit or a printer unit, and is configured to process a job related to image forming processing, wherein the acquisition unit is configured to acquire a job list related to image forming processing in operation, from a native unit running on an operating system (OS) of the apparatus via a device control library, and wherein, in a case where the acquired job list related to the image forming processing in operation includes a job related to the image forming processing issued by the target application instructed to stop, the instruction unit is configured to instruct the native unit to stop the processing of the job related to the image forming processing via the device control library.

4. The apparatus according to claim 1, wherein the error screen displays an error code to be notified.

5. The apparatus according to claim 1, wherein the framework manages the declaration about a resource described in the application file, but cannot control the application based on the declaration.

6. A method for controlling an apparatus including an application framework for managing a life cycle of an application, the method comprising:

in response to receiving an installation instruction, causing the framework to install a target application;

acquiring from the framework a declaration of a maximum value of a usage amount of a resource described in an application file corresponding to the target application;

a first determining step of determining a usage amount of a resource that is uniquely allocated to an application on installation of the application and used by the target application at predetermined timing, and a second determining step of determining whether a type of the target application is an application of Normal service that is not an authentication application;

at a timing after the target application is installed, in a case where the first determining step determines that the determined usage amount of the resource used at the predetermined timing by the target application exceeds the declaration of the maximum value of the usage amount of the target application, and the second determining step determines that the type of the target application is the application of Normal service that is not the authentication application, instructing the framework to stop the target application, and at a timing after the target application is installed, in a case where the first determining step determines that the determined usage amount of the resource used at the predetermined timing by the target application exceeds the declaration of the maximum value of the usage amount of the target application, and the second determining step determines that the type of the target application is not the application of Normal service that is not the authentication application, instructing the apparatus to display an error screen without instructing the framework to stop the target application, and wherein, before instructing the framework to stop the target application or the apparatus to display the error screen, the apparatus displays a message indicating the target application has a problem on a status line.

7. A non-transitory storage medium storing a program for causing an apparatus to perform a method according to claim 6.

* * * * *